Patented Apr. 25, 1944

2,347,447

UNITED STATES PATENT OFFICE 2,347,447

PREPARATION OF TRIOXANE

Joseph Frederic Walker, Lewiston, N. Y., assignor to E. I. du Pont de Nemours & Company, Wilmington, Del., a corporation of Delaware No Drawing. Application April 30, 1942,
Serial No. 441,230

6 Claims. (Cl. 260—340)

This invention relates to the preparation and recovery of symmetrical trioxane, the cyclic formaldehyde trimer which is also known as alpha-trioxymethylene. It is also directed to a new and valuable azeotropic mixture of trioxane and water.

More particularly, the invention relates to the separation and recovery of trioxane (alpha-trioxymethylene) from aqueous mixtures containing trioxane in association with greater or lesser amounts of formaldehyde. This is accomplished by utilization of a process wherein the trioxane is recovered by distilling the aqueous mixture under carefully controlled conditions. Generally the aqueous mixture will include, in addition to trioxane and formaldehyde, an acidic substance, such as sulfuric acid. Under these conditions the formaldehyde is converted to trioxane as will be more fully explained below.

I am primarily concerned with the isolation of trioxane by distilling the reaction mixture under such conditions that the distillate comprises a maximum percentage of the desired product. This means that for given amounts of trioxane, the distillate contains minimal amounts of formaldehyde and water. These results are accomplished by carrying out the distillation under carefully controlled temperature conditions.

It is appreciated in the art that symmetrical trioxane may be prepared from aqueous solutions of formaldehyde which are acidic in reaction. In one typical process an acidic solution of formaldehyde is utilized, which solution has a hydrogen ion concentration corresponding to that caused by the presence of from 0.1 to 4.0% by weight of sulfuric acid. The s-trioxane is formed in the aqueous formaldehyde solution and is removed therefrom by distillation, the desired product being found in the distillate. In all previous processes, however, no attempt has been made to secure a distillate which contains a maximum amount of trioxane, one in which the amounts of formaldehyde and water per pound of recovered product are relatively small.

I have now discovered that by carefully controlling the temperature at which the aqueous mixture of formaldehyde and trioxane (usually also containing various amounts of acid) is subjected to distillation, it is possible to operate so that the percentage of trioxane in the liquid collected in the condenser is very high. Specifically, I have found that by carefully controlling the distillation so that the vapors passing over are only those boiling within the range 90–92° C., the amounts of water and formaldehyde present in the distillate will be at a minimum, the weight ratio of formaldehyde to trioxane therein in no case exceeding 0.5.

In previous methods wherein the character of the distillate or the temperature at which distillation takes place are not controlled, it has frequently been necessary to distill four pounds or more of formaldehyde per pound of trioxane recovered. In accordance with my improved process, as high as 60–70% of the distillate may comprise the desired trioxane product. In this way the cost of the distilling operation per pound of recovered s-trioxane is greatly reduced.

Accordingly, one of the objects of this invention is the development of an improved process for isolating or recovering symmetrical trioxane (alpha-trioxymethylene) from aqueous solutions containing formaldehyde in addition to the trioxane, this procedure being such that but minimum amounts of water and formaldehyde are distilled per pound of product. Another object of this invention involves the accomplishment of the foregoing purpose by operating so that the composition of the distillate approaches as closely as possible an azeotropic mixture of water and trioxane, which mixture will, however, also generally contain greater or lesser amounts of formaldehyde, the amount of formaldehyde not exceeding 0.5 pound per pound of trioxane. These and still further objects of my invention will be apparent from the ensuing disclosure of certain preferred embodiments thereof.

The solution from which the trioxane is recovered may be one containing water, formaldehyde, and trioxane, also containing, in addition, other materials such as acidic catalysts. As an alternative, the solution may constitute essentially an aqueous solution of formaldehyde containing an acidic catalyst, the solution having a hydrogen ion concentration corresponding to that caused by the presence of from 0.1 to 4.0 percent by weight of sulfuric acid. In the latter case, in accordance with well-understood principles, the trioxane is formed in situ during the operation. The concentration of formaldehyde in the starting solution may vary from 30 to 70%, although the concentration should preferably fall within the range 60–65% for most satisfactory results.

The reaction medium is subjected to distillation under conditions such that a constant boiling mixture having a boiling point within the range 90 to 92° C. is distilled from the apparatus. This is preferably accomplished by employing an efficient distillation column. Where the initial starting material comprises an acidic solution of formaldehyde, containing a strong acidic catalyst equivalent to from 0.1 to 4.0% concentration of sulfuric acid by weight, the distillation should take place under reflux at a rate consistent with trioxane formation. Symmetrical trioxane passes over into the distillate, from which it may readily be recovered by treatment with any water-immiscible solvent.

The proportions of trioxane, formaldehyde, and water in the distillate when aqueous solutions of formaldehyde of varying concentrations are distilled are given in the following table. This table also discloses the boiling point, about 91.3° C., and the composition of the azeotropic mixture comprising 70% by weight of trioxane and 30% by weight of water.

| Mixture distilled | Boiling point | Weight-percentage composition of distillate | | |
|---|---|---|---|---|
| | | Trioxane | Formaldehyde | Water |
| | °C. | | | |
| Trioxane+water | 91.3 | 70 | | 30 |
| Trioxane+20% aqueous formaldehyde solution | 90.3 | 65 | 6 | 29 |
| Trioxane+37% aqueous formaldehyde solution | 90.3 | 63 | 10 | 27 |
| Trioxane+60% aqueous formaldehyde solution | 91.5 | 60 | 16 | 24 |

The s-trioxane may be isolated by extraction in a continuous or batch process by means of a water-immiscible solvent. The distillate may be returned to the reaction vessel, fortified by the addition of further amounts of formaldehyde equivalent to the trioxane extracted, and subjected to redistillation under constant boiling conditions.

The product is a white crystalline solid melting at 63–64° C. and boiling at 114.5° C. It is very soluble in methylene chloride, acetone, and chloroform, and readily soluble in carbon tetrachloride, alcohol, ether, and benzene. It is difficultly soluble in petroleum ether. At room temperature trioxane dissolves in water to the extent of about 20%. It is evident that any of the water-immiscible solvents noted may be utilized for its extraction from the condensate collected in the condenser or collector in communication with the still apparatus.

The new azeotropic constant boiling mixture of trioxane and water, of constant composition, boils under normal atmospheric pressure at about 91.3° C. In practice, when aqueous solutions of water, trioxane, and formaldehyde are subjected to distillation, the distillate will generally contain greater or lesser amounts of formaldehyde. However, when the amount of formaldehyde present does not exceed 0.5 pound per pound of trioxane, the boiling point of the ternary mixture is very close to that of the trioxane-water azeotrope, falling within the range 90–92° C.

As an example of my improved procedure for the recovery of symmetrical trioxane, the following may be given:

*Example*

A charge of 1014 parts of 61.4% formaldehyde solution containing 2.25% sulfuric acid was placed in a glass still pot equipped with an agitator and a packed fractionating column surmounted by a still head equipped with an adjustable bayonet condenser. The receiving apparatus was so arranged that vapors leaving the still head would pass through a glass chamber, containing a bimetallic thermoregulator which controlled the electric elements supplying heat to the still pot, from which they then passed into a vessel which acted both as a receiver and condenser. This vessel, which contained trichlorobenzene, was maintained at a temperature in the range 30°–40° C. and was so constructed that the hot vapors entered below the surface of the solvent.

Distillation was carried out at such a rate that the vapors leaving the still head were in the temperature range 90°–92° C. This rate was controlled by adjusting the thermoregulator and maintaining an adequate reflux ratio in the distilling column. Upon condensing, the vapors were extracted by the trichlorobenzene. The s-trioxane formed dissolved in this solvent, whereas formaldehyde and water condensed to form aqueous formaldehyde, which floated on the top of the trichlorobenzene phase.

The trichlorobenzene extract and formaldehyde solution were removed from the receiver from time to time and fresh trichlorobenzene was added. The trichlorobenzene extract removed was washed with a small amount of 28% ammonia and dried with calcium chloride. It was then placed in a still and its trioxane content isolated by distillation. Solvent from which the s-trioxane had thus been removed could then be reused in the process.

Recovered formaldehyde was reutilized to produce further amounts of s-trioxane after fortification to 60% concentration. The yield of s-trioxane was 80% as based on formaldehyde consumed. The distillate from the reactor contained approximately 0.4 gram formaldehyde per gram s-trioxane.

It is apparent that various changes and variations conforming to the spirit of the invention may be carried out, and such variations are intended to be included within the scope of the appended claims.

I claim:

1. A process for separating trioxane from an aqueous mixture in which it is present with formaldehyde which comprises distilling said aqueous mixture under such conditions that the distillate comprises essentially only a low boiling mixture having a boiling point within the range 90–92° C., said distillate comprising trioxane and water, and an amount of formaldehyde not exceeding 0.5 part by weight for each part of trioxane present therein; and then separating the trioxane from the distillate.

2. A process for separating trioxane from an aqueous mixture in which it is present with formaldehyde which comprises distilling said aqueous mixture under such conditions that the distillate comprises essentially only a low boiling mixture having a boiling point within the range 90–92° C., said distillate comprising trioxane and water and an amount of formaldehyde not exceeding 0.5 part by weight for each part of trioxane present therein; and then treating said distillate with a solvent for trioxane which is immiscible with water in order to extract said trioxane therefrom.

3. A process for recovering trioxane which comprises distilling an aqueous solution of formaldehyde containing from 30 to 70% of formaldehyde under such conditions that only a low boiling mixture having a boiling point within the range 90 to 92° C. is distilled, said low boiling mixture comprising water, trioxane and formaldehyde, the formaldehyde content thereof not exceeding 0.5 part by weight for each part of trioxane present; and then recovering trioxane from said distillate.

4. A process for recovering trioxane which comprises distilling an aqueous solution of formaldehyde containing from 30 to 70% of formaldehyde under such conditions that only a low boiling mixture having a boiling point within the range 90 to 98° C. is distilled, said mixture comprising water, trioxane and formaldehyde, the formaldehyde content thereof not exceeding 0.5 part by weight for each part of trioxane present; and then treating said distillate with a solvent for trioxane which is immiscible with water in order to extract said trioxane therefrom.

5. A process for recovering trioxane which comprises distilling an aqueous solution of formaldehyde containing from 30 to 70% of formaldehyde, said solution having a hydrogen ion concentration corresponding to that caused by the presence of 0.1 to 4.0% by weight of sulfuric acid, said distillation being carried out under such conditions that only a low boiling mixture boiling within the range 90–92° C. is distilled, said mixture comprising trioxane, water, and an amount of formaldehyde not exceeding 0.5 part by weight for each part of trioxane present; and then separating the trioxane from said distillate.

6. A process for recovering trioxane which comprises distilling an aqueous solution of formaldehyde containing from 30 to 70% of formaldehyde, said solution having a hydrogen ion concentration corresponding to that caused by the presence of 0.1 to 4.0% by weight of sulfuric acid, said distillation being carried out under such conditions that only a low boiling mixture boiling within the range 90–92° C. is distilled, said mixture comprising trioxane, water, and an amount of formaldehyde not exceeding 0.5 part by weight for each part of trioxane present; and then treating said distillate with a solvent for trioxane which is immiscible with water in order to extract said trioxane therefrom.

JOSEPH FREDERIC WALKER.

CERTIFICATE OF CORRECTION.

Patent No. 2,347,447.                                        April 25, 1944.

JOSEPH FREDERIC WALKER.

It is hereby certified that error appears in the printed specification of the above numbered patent requiring correction as follows: Page 3, first column, line 6, claim 4, for "90 to 98° C." read --90 to 92° C.--; and that the said Letters Patent should be read with this correction therein that the same may conform to the record of the case in the Patent Office.

Signed and sealed this 6th day of June, A. D. 1944.

Leslie Frazer (Seal)                                    Acting Commissioner of Patents.